(12) United States Patent
Flamanc et al.

(10) Patent No.: US 7,767,975 B2
(45) Date of Patent: Aug. 3, 2010

(54) IONIZING RADIATION DETECTOR

(75) Inventors: Jérémy Flamanc, Fontainebleau (FR); Guillaume Gautier, Mennecy (FR)

(73) Assignee: Saint-Gobain Cristaux et Detecteurs, Courbevoie (FR)

( * ) Notice: Subject to any disclaimer, the term of this patent is extended or adjusted under 35 U.S.C. 154(b) by 0 days.

(21) Appl. No.: 12/037,695

(22) Filed: Feb. 26, 2008

(65) Prior Publication Data

US 2009/0140153 A1    Jun. 4, 2009

(30) Foreign Application Priority Data

Dec. 4, 2007   (FR) .................... 07 59555
Feb. 13, 2008  (FR) .................... 08 50895

(51) Int. Cl.
*G01T 1/20* (2006.01)

(52) U.S. Cl. ............... 250/370.11; 250/361 R
(58) Field of Classification Search ............. 250/361 R, 250/370.11
See application file for complete search history.

(56) References Cited

U.S. PATENT DOCUMENTS

| | | | |
|---|---|---|---|
| 4,535,243 A * | 8/1985 | Peschmann ............ | 250/363.02 |
| 6,021,341 A * | 2/2000 | Scibilia et al. .............. | 600/407 |
| 7,067,815 B2 | 6/2006 | Dorenbos et al. | |
| 7,067,816 B2 | 6/2006 | Dorenbos et al. | |
| 7,084,403 B2 | 8/2006 | Srivastava et al. | |
| 7,151,261 B2 | 12/2006 | Chai | |
| 7,202,477 B2 | 4/2007 | Srivastava et al. | |
| 7,233,006 B2 | 6/2007 | Dorenbos et al. | |
| 7,250,609 B2 | 7/2007 | Dorenbos et al. | |
| 7,332,028 B2 | 2/2008 | Iltis et al. | |
| 2005/0006589 A1 | 1/2005 | Joung et al. | |
| 2005/0082484 A1 | 4/2005 | Srivastava et al. | |
| 2005/0104001 A1 | 5/2005 | Shah et al. | |
| 2005/0127300 A1 | 6/2005 | Bordynuik | |
| 2006/0104880 A1 | 5/2006 | Iltis et al. | |
| 2006/0131503 A1 * | 6/2006 | Freund et al. ............ | 250/361 R |
| 2006/0226368 A1 | 10/2006 | Srivastava et al. | |
| 2006/0237654 A1 | 10/2006 | Srivastava et al. | |
| 2007/0090328 A1 | 4/2007 | Dorenbos et al. | |
| 2007/0205372 A1 * | 9/2007 | Pauly et al. ............ | 250/390.01 |
| 2007/0241284 A1 | 10/2007 | Iltis et al. | |

(Continued)

FOREIGN PATENT DOCUMENTS

WO    99/61880 A    12/1999

(Continued)

OTHER PUBLICATIONS

Allier, C.P., et al., "Readout of a LaCl3 (Ce3+) Scintillation Crystal with A Large Area Avalanche Photodiode," Nuclear Science Symposium Conference Record, Oct. 15, 2000 IEEE Lyon, FR, vol. 1, pp. 6/182-6/184, 2000, XP010556545.

(Continued)

*Primary Examiner*—David P Porta
*Assistant Examiner*—Mindy Vu
(74) *Attorney, Agent, or Firm*—Larson Newman & Abel, LLP; Christian Colombier (57) ABSTRACT

An ionizing radiation detector comprising a housing includes a scintillator material, an avalanche photodiode in contact with the scintillator material via optical coupling, and a preamplifier.

32 Claims, 2 Drawing Sheets

U.S. PATENT DOCUMENTS

| | | | |
|---|---|---|---|
| 2007/0295915 A1 | 12/2007 | Kraemer et al. | |
| 2008/0103391 A1* | 5/2008 | Dos Santos Varela | 600/436 |
| 2008/0173819 A1* | 7/2008 | Grazioso et al. | 250/363.05 |
| 2008/0296503 A1 | 12/2008 | Srivastava et al. | |
| 2009/0008561 A1 | 1/2009 | Nagarkar et al. | |
| 2009/0140150 A1* | 6/2009 | Ivan et al. | 250/361 R |

FOREIGN PATENT DOCUMENTS

| | | |
|---|---|---|
| WO | 01/60944 A2 | 8/2001 |
| WO | 01/60945 A2 | 8/2001 |
| WO | 03-106741 | 12/2003 |
| WO | 2004044613 A2 | 5/2004 |
| WO | 2007/031583 | 3/2007 |

OTHER PUBLICATIONS

Grazioso, R., et al., "APD Performance in Light Sharing PET Applications," IEEE Transactions on Nuclear Science IEEE, USA, vol. 52, No. 5, Oct. 2005, pp. 1413-1416, 2005, XP002503510.

G.F Knoll, "Radiation Detection and Measurement", John Wiley and Sons, Inc., 2nd edition, p. 114.

R. Scafè et al., Nuclear Instruments and Methods in Physics Research A 571 (2007) 355-357.

K. S. Shah et al., IEEE Transactions on Nuclear Science, vol. 51, No. 5, Oct. 2004.

C. P. Allier et al., Nuclear Instruments and Methods in Physics Research A 485 (2002) 547-550.

K. Findley et al. ("Fracture and deformation behaviour of common and novel scintillating single crystals", Proceedings of SPIE, The International Society for Optical Engineering, 2007, vol. 6707, pp. 6707 06.

J. Völkl, "Stress in cooling crystal" in Handbook of Crystal Growth, Ed. North Holland, Edited by D. T. J. Hurle, 1994, ISBN 0-444-81554-6, pp. 821-874.

U.N. Roy et al., "Hard X-Ray and Gamma-Ray Detector Physics VII", Proceedings of the SPIE, 5922, 2005, pp. 30-34.

E.V.D. van Loef et al., IEEE Trans. Nucl. Sci., 52, 5, 2005, pp. 1819-1822.

K. Krämer et al. Development and characterization of highly efficient new cerium doped rare earth halide scintillator materials, J. Mater. Chem., 2006, 16, pp. 2773-2780.

C. van Eijk et al. Development of elpasolite and monoclinic thermal neutron scintillators, 2005 IEEE Nucl. Sci. Symp. Conf. Record, 1, pp. 239-243.

J. Glodo et al., IEEE Nucl. Sci. Symp. Conf. Record, 2005, pp. 98-101.

E.V.D. van Loef et al., Optics Communications, 189, 2001, pp. 297-304.

O. Guillot-Noël et al., J. Luminescence, 85, 1999, pp. 21-35.

W. Moses et al., Nucl. Instruments and Methods in Physics Research, A, 537, 2005, pp. 317-320.

Okamura, S. et al., "Readout of scintillating fibers by avalanche photodiodes operated in the normal avalanche mode," Nuclear Instruments and Methods in Physics Research A, vol. 388, pp. 234-240, 1997.

W.M. Higgins et al.; "New Scintillator Compositions"; Proceedings of SPIE—The International Society for Optical Engineering—Penetrating Radiation Systems and Applications VIII 2007 SPIE US, vol. 6707, 2007, XP002508317, pp. 670704-1, ligne 26—pp. 670704-2, ligne 27; figure 1-4.

W.M. Higgins et al.; "Crystal Growth of Large Diameter LaBr3:Ce and CeBr3"; Journal of Crystal Growth, Elsevier, Amsterdam, NL, vol. 310, No. 7-9, Apr. 1, 2008, pp. 2085-2089, XP022697586, ISSN: 0022-0248 [extrait le Dec. 23, 2007] pp. 2085, colonne 2, ligne 19—p. 2087, colonne 1, ligne 10; figures 1-3; tableau 1.

FR Search Report, 2 pgs. 2008.

M. D. Birowosuto, "Ce3+ activated LaBr3-xIx: High-light-yield and fast-response mixed halide scintillators," Journal of Applied Physics, vol. 103, pp. 103517-1 to 103517-6, 2008.

A Bessiere et al., "Luminescence and scintillation properties of the small bandgap compound LaI3:Ce3+", Nuclear Instruments and Methods in Physics Research, Section A 537, 2005, pp. 22-26.

J. Glodo et al., "Scintillation properties of some Ce-doped mixed lanthanum halides", Proceedings of the 8th International Conference on Inorganic Scintillators and their Use in Scientific and Industrial Applications (SCINT 2005), Alushta (Crimea, Ukraine), ISBN 9666 02 3884 3, pp. 118-120.

* cited by examiner

IONIZING RADIATION DETECTOR

The present application claims priority from French Application No. 0759555, filed Dec. 4, 2007, and French Application No. 0850895, filed Feb. 13, 2008, which applications are incorporated by reference herein in their entirety.

The invention concerns the field of detecting ionizing radiation, in particular X-rays or gamma rays, using a crystal scintillator.

Ionizing radiation (which includes ionizing particles such as in particular protons, neutrons, electrons, alpha particles, and X-rays or gamma rays) are usually detected using single-crystal scintillators that convert the incident radiation into light, which is then converted into an electrical signal using a photomultiplier. In the case of X-rays or gamma rays the scintillators used can be, in particular, made of doped single crystals of NaI, CsI or lanthanum halide. Lanthanum halide based crystals have been the subject of recent work such as that published under U.S. Pat. No. 7,067,815, U.S. Pat. No. 7,067,816, US2005/188914, US2006/104880, and US20071241284. These crystals are promising in terms of luminous intensity and resolution, but require special precautions as a result of their hygroscopic character.

These detection systems are used, inter alia, in the field of medical imaging scanners, airport security scanners, and oil exploration. The conversion of the light emitted by the crystal into an electrical signal is generally effected by a photomultiplier. Photomultipliers are relatively restrictive due to their high-voltage power supply and are bulky and fragile as a result of the glass bulb they contain.

There is a need in particular for a system for detecting X-rays or gamma rays that is portable and mobile. Indeed, it is desired that certain people, specifically those assigned to security, should be easily able to detect this type of radiation by their mere presence. This need exists particularly in security and safety activities concerning ionizing radiation. This involves, for example, detecting and identifying illicit radioactive sources. These systems must detect X-rays or gamma rays and, preferably, be capable of identifying the nature of the radioisotope.

It is therefore useful to develop compact systems for detecting ionizing radiation, and more particularly X-rays or gamma rays. A system for detecting X-rays or gamma rays is elaborated in more detail below, it being understood that the principle of this system can be adapted to detect other types of ionizing radiation as soon as the scintillator and the input window are adapted to said targeted types of radiation. Such a compact detector must be as small as possible while preserving good detection properties, particularly as far as signal resolution and energy linearity (that is, the proportionality between the energy of the X-ray and gamma photons and the detector's response) are concerned. In particular, the photomultiplier usually used to convert the scintillator light into an electrical signal occupies a fairly large volume, of around 180 $cm^3$, and it is desirable to be able to reduce this volume. In addition, photomultipliers work at high voltage and are sensitive to external magnetic fields, such as that of the Earth for example. Photodiodes are able to detect the light, but they generally produce noise that impairs resolution and the threshold of minimum detectable energy (typically 60 keV). The performance and the resolution obtained can be improved by cooling the photodiode. There are several types of photodiode: PN, PIN, avalanche photodiodes (in linear mode or Geiger mode), silicon drift detectors, etc.

The energy resolution of an ionizing radiation detector in fact determines its capacity to separate very close radiation energies. It is usually determined for a given detector, at a given energy, as the half-peak width of the peak considered over an energy spectrum obtained from this detector, normalized with respect to the peak centroid energy (see in particular G. F Knoll, "Radiation Detection and Measurement", John Wiley and Sons, Inc, 2nd edition, p 114). The percentage resolution is the half-peak width of the photoelectric peak divided by the energy of this peak and multiplied by 100. In the following text, for all measurements carried out, the resolution is determined at 662 keV, the energy of the principal gamma emission of Cs 137.

The article by R. Scafe et al., Nuclear Instruments and Methods in Physics Research A 571 (2007) 355-357 teaches detection of the light emitted by a $LaBr_3$:Ce crystal by an avalanche photodiode. The crystal had a diameter of 12 mm and the photodiode an area of 5 mm×5 mm. The crystal was provided by Saint-Gobain and was encapsulated in an aluminum housing with a 5 mm thick glass window. The photodiode was outside this housing and received the light emitted by the crystal through the glass window. A fortiori the preamplifier was also outside the housing. The gamma radiation was received through a 0.5 mm thick aluminum window. The observed resolution was 7.3% for incident photons of 662 keV energy.

The article by K. S. Shah et al., IEEE Transactions on Nuclear Science, Vol. 51, No. 5, October 2004 compares the detection of light emitted by an $LaBr_3$ crystal doped with 0.5% Ce by an avalanche photodiode on the one hand and by a photomultiplier on the other. The avalanche photodiode was cooled to 250 K (or −23° C.). This article concludes that at ambient temperature photomultiplier detection would be chosen to obtain the highest resolution.

The article by C. P. Allier et al., Nuclear Instruments and Methods in Physics Research A 485 (2002) 547-550 reports on the detection of light emitted by a $LaCl_3$:Ce crystal by an avalanche photodiode working at a voltage of 1500-1700 volts. The photodiode was coupled to the crystal by means of a low viscosity silicon grease. Taking account of the hygroscopic character of the crystal used and this being an experimental system in a university environment, the assembly was necessarily carried out entirely in a glove box in an inert atmosphere, said glove box containing the radioactive source, the crystal and the photodiode, the latter probably being cooled. The reported resolution was 3.65% at 662 keV.

EP1435666 teaches a detector, in a housing, a scintillator whose light is focused onto an avalanche photodiode by means of a lens. It was observed that the distance of the photodiode from the scintillator, due to the multitude of materials (glass lens, air around the lens) between the scintillator and the photodiode, in fact leads to mediocre results in terms of resolution.

The possibility has now been found of producing a detection system at ambient temperature (without a cooling system) comprising an avalanche photodiode and leading to excellent resolution, which may be less than 3.5%, or even less than 3%, or even less than 2.9% at 662 keV. It must be understood that the more the resolution of a detection system is improved, the more difficult it is to improve it further. Thus with a lanthanum bromide based crystal, passing, for example, from a resolution of 3.0 to 2.9% is a very significant step forward.

The detector according to the invention in particular allows X-ray or gamma ray detection with excellent resolutions and with a very low detection threshold. This detection threshold can, specifically, be less than 15 keV, even less than 12 keV, or even less than 11 keV, measured with an americium 241 source. The detection threshold is given by the abscissa of the valley between the noise at low energy (to the left of the valley) and the source signal (generally americium 241). A detector which has a good detection threshold with one source will have a good detection threshold with another source.

The detection system is based on the compactness of its various components, all arranged in a sealed housing, with a minimum of material and of distance between its different elements. Indeed it has been observed that rigorous application of this principle leads to results that are noteworthy and surprising in terms of resolution and detection threshold. The invention thus concerns a sealed housing for the detection of ionizing radiations and in particular for the detection of X-rays and gamma rays, comprising a scintillator material (in particular a rare earth halide crystal when X-rays or gamma rays are targeted), an avalanche photodiode coupled to the scintillator material by optical coupling, and a preamplifier for amplifying the electrical signal from said photodiode. It appears that the compactness of this system, by reducing the distance between its various components, is one of the elements allowing the noise that usually impairs the resolution and detection threshold to be reduced to a minimum. Reducing the distance reduces noise. Encapsulating the components in the metal housing and adding a metal plate between the photodiode and the preamplifier also allows noise to be reduced by providing electromagnetic shielding. With a crystal made of $LaBr_3$:Ce (cerium doped lanthanum bromide) provided with a light guide, the detection threshold is around 40 keV in a nonencapsulated system without shielding. It is reduced by 20 keV thanks to the encapsulation. These measurements are found in Table 1, in rows 2 and 10. The importance of the quality of encapsulation and of the shielding will therefore be understood. According to the invention, in an optimized system, the detection threshold can even be less than 10 keV (row 14 of Table 1).

The housing according to the invention is small in size, it being possible for its external volume to be less than 1000 $cm^3$ and even less than 500 $cm^3$, 300 $cm^3$, 100 $cm^3$ or 60 $cm^3$. The inventors have even already produced a housing with a volume as low as 50.4 $cm^3$ and including a parallelepipedal scintillator with the dimensions $9\times9\times20$ $mm^3$. A smaller crystal would allow the volume of the housing to be reduced even more, but said crystal would stop less radiation and the sensitivity of the detector would be lower.

The scintillator material can have a volume between 1 and 50000 $mm^3$. When the rays to be detected are low energy, low scintillator volumes can suffice. For higher energies, larger volumes are preferable. Specifically for the detection of X-rays or gamma rays, the scintillator preferably has a volume larger than 1000 $mm^3$ and even larger than 1300 $mm^3$ its volume is generally less than 10000 $mm^3$ and even less than 5000 $mm^3$. Thus the housing according to the invention can even be smaller in size than a simple photomultiplier.

The detector according to the invention is light. The mass of the detector previously mentioned, containing the $9\times9\times20$ $mm^3$ scintillator as well as the electronics with electrical connections, is around 60 grams. Thus the detector according to the invention can weigh less than 100 grams. Finally the detector can be portable (it fits in the hand, in a pocket, etc.), resistant to impacts and vibrations, resistant to bad weather, and resistant to extreme temperatures (−20 to +50° C.).

The housing is a container, preferably comprising a metal, and it must allow the types of radiation to be detected to pass through to the scintillator material. It must also be opaque to visible light and preferably provide shielding from electromagnetic waves of all kinds (mobile phone, radio waves, television waves etc.) that are capable of interfering with electronic circuits. The housing can therefore be at least partly, or totally, made of a metal that allows the radiation to be detected to pass, such as aluminum (it should be noted that the term "aluminum" also covers aluminum alloys compatible with the application, that is alloys permeable to the intreated radiation and especially to X-rays and gamma rays). Notably, one face of the housing can serve more particularly for receiving radiation. Thus the face of the housing acting as a window may be a little thinner than the other walls of the housing. The housing can also be made of a plastic (a polymer material such as, for example, PE, PP, PS) and be covered with a thin layer or foil of metal such as aluminum. For example, the housing may be a parallelepiped made completely of aluminum (or aluminum alloy) and have one face thinner than the others. In the case of detecting X-rays or gamma rays, by way of example, this face may be made of aluminum of 0.5 mm thickness, the other walls possibly being made for example of aluminum of 1 mm thickness. For the detection of ionizing particles, an aluminum window must be much thinner (of the aluminum "foil" type).

In the case of detecting X-rays or gamma rays the housing contains the scintillator material comprising a rare earth halide. This is generally of the single-crystal type and comprises a rare earth halide, essentially a chloride, bromide, iodide or fluoride, generally of formula $A_nLn_pX_{(3p+n)}$ in which Ln represents one or more rare earths, X represents one or more halogen atoms chosen from F, Cl, Br or I, and A represents one or more alkali metals such as K, Li, Na, Rb or Cs, n and p representing values such that:

n, which can be zero, is less than or equal to 3p p is greater than or equal to 1.

The rare earths (in the form of halides) concerned are those in column 3 of the Periodic Table, including Sc, Y, La, and the lanthanides from Ce to Lu, More particularly concerned are the halides of Y, La, Gd and Lu, especially doped with Ce or Pr (the term "dopant" here refers to a rare earth that is generally a minor component in molar terms, replacing one or more rare earths that are generally major components in molar terms, the minor and major components being included under the abbreviation Ln).

More particularly concerned are especially materials of formula $A_nLn_{p-x}Ln'_xX_{(3p+n)}$ in which A, X, n and p have the previously given meanings, Ln being chosen from Y, La, Gd and Lu or a mixture of these elements, Ln' being a dopant such as Ce or Pr, and x is greater than or equal to 0.01p and less than p, and ranges more generally from 0.01p to 0.9p. Especially of interest within the context of the invention are materials combining the following characteristics:

A chosen from Li, Na and Cs,

Ln chosen from Y, La, Gd, Lu or a mixture of these rare earths, Ln being more particularly La, Ln' being Ce, X chosen from F, Cl, Br, I or a mixture of several of these halogens, especially a mixture of Cl and Br, or a mixture of Br and I.

A scintillator material particularly suited to the detection of X-rays or gamma rays is a single crystal comprising $LaX_3$ doped with cerium (Ce), where X represents Br, Cl or I, with halide mixtures, especially chloride/bromide mixtures, being possible. When speaking of a cerium-doped rare earth halide, a person skilled in the art will immediately know that the cerium is in halide form, that is to say that the rare earth halide contains a cerium halide. The following single crystals, especially, are particularly suited:

$LaBr_3$ doped with 1 to 30 mol % of $CeBr_3$;

$LaCl_3$ doped with 1 to 30 mol % of $CeCl_3$;

$yLaBr_3+(1-y)CeBr_3$ with $y\geq 0$.

The scintillator material can, in particular, be cylindrical or parallelepipedal and be larger along one axis. This axis is then perpendicular to the plane of the photodiode. The scintillator material is placed in the housing in immediate proximity to that wall of the housing acting as window. A sheet of a shock-absorbing material may be placed between the crystal and the wall of the housing.

The scintillator material is generally covered with a light reflector. This reflector preferably covers all the sides of the scintillator material, apart from the area through which the light emitted by the scintillator must pass to reach the photodiode. The light reflector may be made of PTFE (polytetrafluoroethylene). It can therefore be a strip of PTFE with which the scintillator material is surrounded. Before being covered with the light reflector, the external faces of the scintillator material are preferably roughened (or frosted) with an abrasive material such as abrasive paper (especially 400 grit). The roughness thus given to the surface increases the light flux received by the photodetector.

The housing contains an avalanche photodiode. This photodiode is in contact with the scintillator material via an optical coupling material. This might be a silicon grease (polysiloxane) or any other transparent, nonadhesive material, but this optical coupling is preferably an epoxy adhesive. Once the epoxy adhesive has hardened, the photodiode and the crystal are joined together. The optical coupling has a refractive index between that of the scintillator material and that of the avalanche photodiode. When the optical coupling is solid (in the case of an epoxy adhesive) it is preferably chosen such that its thermal expansion coefficient is between that of the avalanche photodiode and that of the scintillator material. It can also be relatively flexible. In this way the coupling better absorbs the differences in thermal expansion between the two materials that it links. This reduces the risks of fracturing the crystal in the case of excessive heating.

The thickness of the optical coupling is preferably less than 2 mm and even less than 1 mm, and more preferably still less than 0.6 mm. For the person skilled in the art the term "optical coupling" excludes a vacuum and gases such as air. An optical coupling is necessarily liquid (which includes "greasy") or solid.

The avalanche photodiode is generally a flat component with two main faces. It is one of these main faces that is in contact with a plane face of the scintillator material via the optical coupling. The face of the scintillator material in contact with the photodiode (contact face of the scintillator material) is preferably inscribed in that face of the photodiode with which it is in contact (contact face of the photodiode). Consideration is taken here of the light-sensitive surface of the photodiode. In fact the photodiode generally comprises a light-sensitive area surrounded by a dead area (insensitive to light) corresponding to the encapsulation material of the photodiode. It should therefore be borne in mind that the expression "contact face of the photodiode" or "contact face area of the photodiode" refers to the sensitive area of the photodiode.

The contact face of the scintillator material and the contact face of the photodiode preferably have the same shape (both are square for example), the contact face of the scintillator material preferably being a little smaller (in a homothetic manner) than the contact face of the photodiode. Preferably, each point on the edge of the contact face of the scintillator material is inside the (sensitive) contact face of the photodiode, and at a distance of between 0.1 and 3 mm, preferably of 0.2 to 0.7 mm, from the edge of the contact face of the photodiode.

The contact face area of the scintillator material is preferably less than 1.5 times, and even less than 1.2 times or even less than 1 times the contact face area of the avalanche photodiode. Saying that the contact face area of the scintillator material is less than 1.5 times the contact face area of the photodiode means that if the contact face area of the photodiode is S, the contact face area of the scintillator material is less than 1.5 multiplied by S. The contact face area of the scintillator material can therefore be greater than the contact face area of the photodiode. However, the contact face area of the scintillator material preferably ranges from 0.8 to 1 times the contact face area of the avalanche photodiode. By way of example, a photodiode with a sensitive surface area of 0.2 cm$^2$ is compared with a photodiode of 1 cm$^2$ in rows 2 and 12 of Table 1. It can be seen that for the 10×10×10 mm$^3$ crystal provided with a glass window performance is very different, going from a resolution of more than 8.5% with the smallest photodiode to almost 3.0% with the largest.

The invention thus also concerns the detection system comprising the scintillator material and the avalanche photodiode, preferably respecting the contact face data just given, even for a noncompact system. A compact system is nonetheless preferred.

The avalanche photodiode preferably works at a voltage of less than 1050 volts, and more preferably still at a voltage of less than 450 volts.

The photodiode generally has two electrical connectors. These two connectors are preferably soldered directly to a charge amplifier called a preamplifier, the components of which are located on a printed circuit that is also incorporated within the housing according to the invention. The preamplifier might, in particular, have the following characteristics: power supply +/−12 V or +24/0 V, gain of 0.1 V/pC to 10 V/pC. An electromagnetic shielding element such as a copper or brass plate, electrically connected to the housing and to ground, is preferably placed between the avalanche photodiode and the preamplifier. The photodiode connectors, insulated by polymer sheaths or by insulating adhesive, pass through the shielding element via orifices. Note that the electromagnetic shielding is an obstacle to electromagnetic waves of all kinds (mobile phone, radio waves, television waves etc.) that are capable of interfering with electronic circuits. The metal housing (which can be of aluminum) contributes to this shielding.

The photodetector used within the context of the present invention is an avalanche photodiode, this term covering a simple individual photodiode, but also an array of avalanche photodiodes, that is a collection of individual avalanche photodiodes grouped on one face of the crystal and the signals of which are summed. This collection therefore includes a dead area (insensitive to light) around the array, but also in general between the individual photodiodes. The characteristics given above for the relation between the contact areas between the avalanche photodiode and the scintillator material remain valid and it is the cumulative area of the light-sensitive contact surfaces of the linked avalanche photodiodes that is taken into consideration. However, in the case of an array of avalanche photodiodes, the surface of the contact face of the scintillator material may be larger than the cumulative (light-sensitive) contact surface of the avalanche photodiodes, due to the existence of dead areas between the individual photodiodes in the array. The silicon PMT can be cited as an example of a photodetector consisting of an array of avalanche photodiodes in Geiger mode.

The housing according to the invention can have an axis passing through the centre of gravity of the scintillator material and the centre of gravity of the radiation entrance window. Moving along this axis, starting with the entrance window, the light reflector, the scintillator material, the optical coupling, the photodiode, the shielding and the preamplifier are successively encountered. The photodiode, the shielding (where this is a plate) and the preamplifier printed circuit, in particular, can be perpendicular to this axis.

The entrance window can also be lateral, that is parallel to an axis of the housing. If the housing is a parallelepiped, five of its faces (the four lateral ones and the front face) can constitute the entrance window.

The compactness of the detector according to the invention is characterized especially by the absence of a light guide between the crystal and the avalanche photodiode (apart from the thin layer of optical coupling, in particular of the epoxy adhesive type, which can have a thickness of less than 0.6 mm, along with a possible protection layer for the surface of the avalanche photodiode), a short distance between the preamplifier and the scintillator material, such that the two closest points, one of the preamplifier and the other of the scintillator material, can generally be less than 2 cm apart.

The invention also concerns a method of detecting ionizing radiation such as X-rays or gamma rays using the detector according to the invention.

The reference numbers have the following meanings:
1: ground wire soldered into the hole in the closure plate
2: aluminum housing
3: preamplifier
4: brass plate (shielding)
5 avalanche photodiode S-8664-1010
6: optical coupling
7: PTFE covering (light reflector)
8: single-crystal scintillator, of which the face on the photodiode side has been polished and the other faces have been roughened
9: 0.5 mm thick aluminum entrance window
10 signal connector
11 low voltage connector
12: high voltage connector
13: insulator The other figures outside the housing are the dimensions in mm.

EXAMPLES

Single crystals of the following were used as scintillator material:

| | |
|---|---|
| CsI doped with 0.8 mol % of Tl | denoted by CsI |
| NaI doped with some Tl | denoted by NaI |
| $LaCl_3$ doped with 10 mol % of $CeCl_3$ | denoted by LaCl |
| $LaBr_3$ doped with 5 mol % of $CeBr_3$ | denoted by LaBr |

These could have the following forms:
cylindrical:

| Diameter | height | |
|---|---|---|
| 25.4 mm | 25.4 mm | denoted by 25 × 25 |
| 12.8 mm | 12.8 mm | denoted by 13 × 13 |
| 6 mm | 6 mm | denoted by 6 × 6 | parallelepipedal:

| Contact face | height | |
|---|---|---|
| 10 mm × 10 mm | 10 mm | denoted by 10 × 10 × 10 |
| 9 mm × 9 mm | 20 mm | denoted by 9 × 9 × 20 |

The energy of the incident rays was 662 keV. The photodiodes were at ambient temperature. The avalanche photodiode (denoted by APD in Table 1) was a Hamamatsu S8664-1010. The photodiode PIN was a Hamamatsu S3590-08. The preamplifier was a Hamamatsu H4083.

The results are gathered in Table 1. The result in the last row illustrates the excellence of a compact system, that is one consisting of a housing that integrates the detector material, the avalanche photodiode and a preamplifier at a short distance from one another.

TABLE 1

| Single-crystal scintillator | | Light guide | Shielding | Compactness | Photodiode | Photodiode area ($cm^2$) | Detection threshold (keV) | Resolution at 662 keV |
|---|---|---|---|---|---|---|---|---|
| Type | Form | | | | | | | |
| LaBr | 13 × 13 | 5 mm glass | NO | NO | APD | 1 | 20 | 4.0 |
| LaBr | 10 × 10 × 10 | 1 mm glass | NO | NO | APD | 1 | 19 | 3.0 |
| LaBr | 6 × 6 | 3 mm glass | NO | NO | APD | 1 | 20 | 3.1 |
| LaBr | 13 × 13 | 5 mm glass | NO | NO | PIN | 1 | 270 | 13.8 |
| LaBr | 12 × 6 | Glass | NO | NO | PIN | 1 | 120 | 12.6 |
| LaBr | 6 × 6 | 3 mm glass | NO | NO | PIN | 1 | 100 | 11.3 |
| CsI | 6 × 6 | 3 mm glass | NO | NO | APD | 1 | 30 | 5.6 |

TABLE 1-continued

| Single-crystal scintillator | | Light guide | Shielding | Compactness | Photodiode | Photodiode area (cm²) | Detection threshold (keV) | Resolution at 662 keV |
|---|---|---|---|---|---|---|---|---|
| Type | Form | | | | | | | |
| NaI | 10 × 10 × 10 | 1 mm glass | NO | NO | APD | 1 | 23 | 6.4 |
| LaCl | 13 × 13 | 5 mm glass | NO | NO | PIN | 1 | | Not calculable |
| LaBr | 10 × 10 × 10 | 1 mm glass | NO | NO | APD | 1 | 41 | 3.2 |
| LaBr | 6 × 6 | 3 mm glass | YES | NO | APD | 0.2 | | 8.4 |
| LaBr | 10 × 10 × 10 | 1 mm glass | YES | NO | APD | 0.2 | | 8.7 |
| LaBr | 25 × 25 | 5 mm glass | NO | NO | APD | 1 | 66 | 5,0 |
| LaBr | 9 × 9 × 20 | <0.5 mm epoxy adhesive | YES | YES | APD | 1 | 10 | 2,8 |

Figure 1:
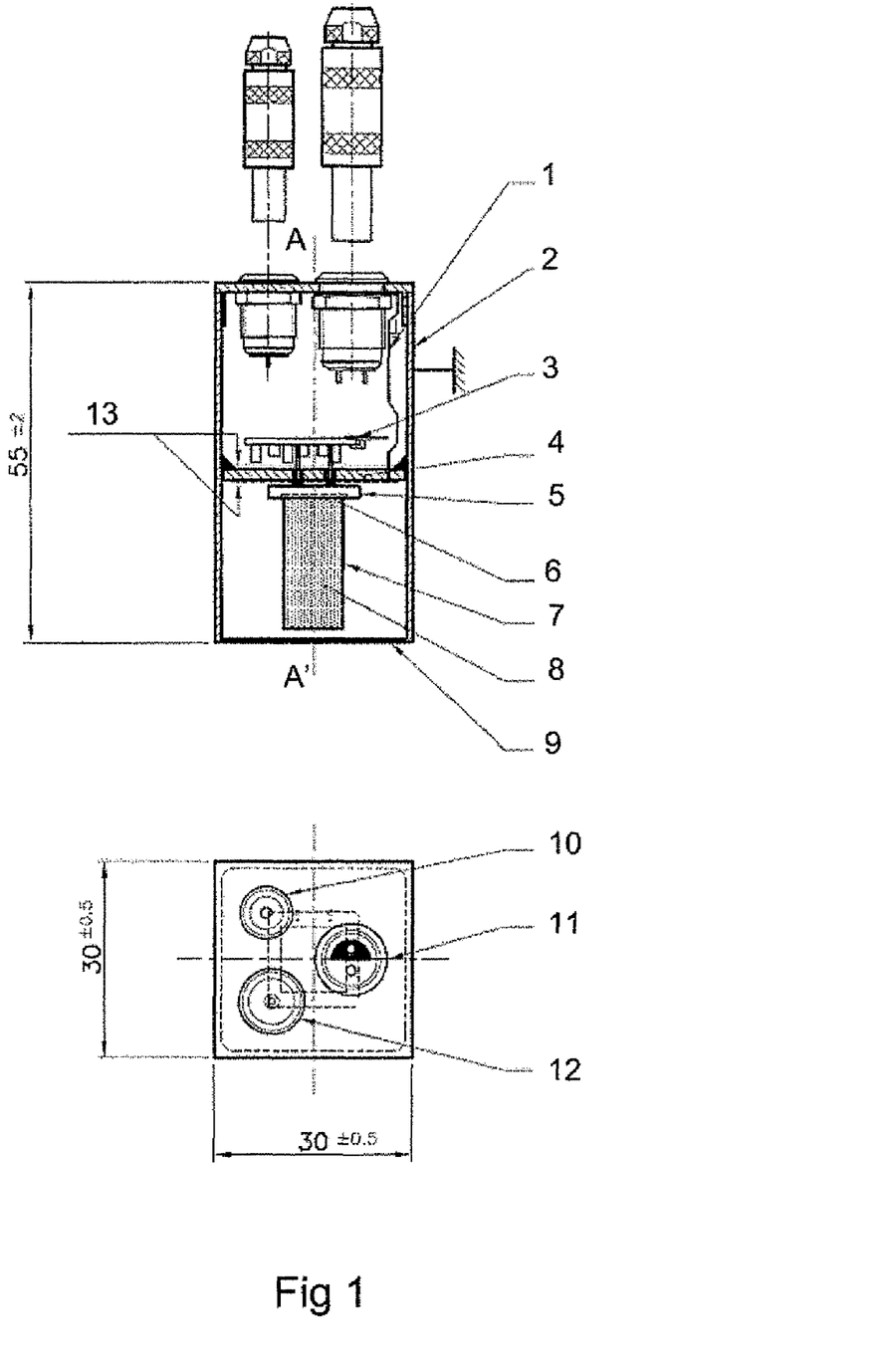
FIG. 1 shows a compact detector according to the invention. It has an axis AA'.
Figure 2:
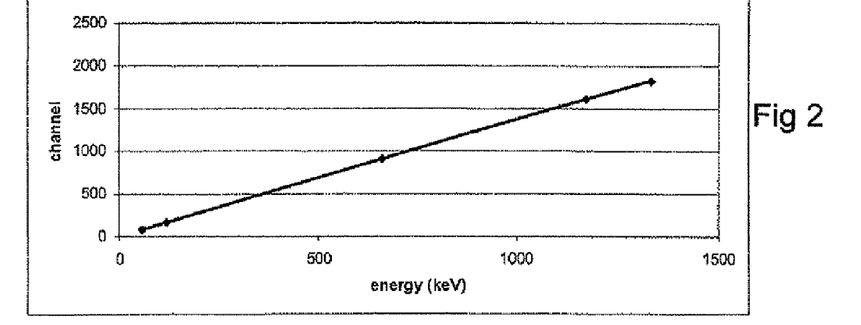
FIG. 2 illustrates the linearity, that is the proportionality between the energy of the incident X-ray or gamma-ray photons and the response of the detection system of the compact detector according to an example of the invention.

FIG. 2 illustrates the good linearity of the system, that is the proportionality between the energy of the incident X-ray or gamma-ray photons (plotted on the x-axis) and the response of the detection system (photoelectric peak value, plotted on the y-axis). It is evaluated by measuring the photoelectric peak value for gamma rays incident at 1332 keV (Co 60), 1173 keV (Co 60), 662 keV (Cs 137), 122 keV (Co 57) and 60 keV (Am 241). Note the absence of a lack of nonlinearity.

Figure 3:
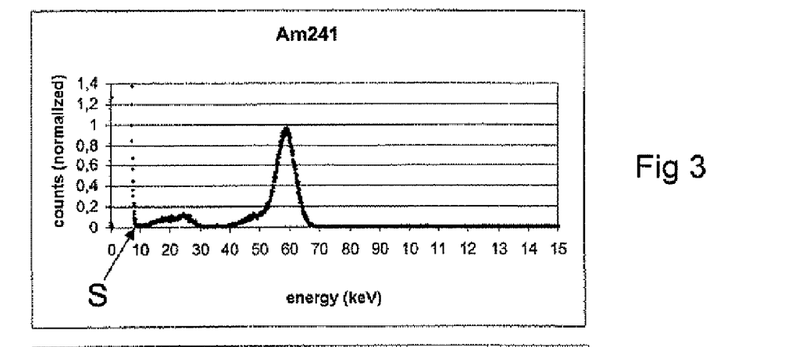
FIG. 3 shows the spectrum of an Am 241 source measured using a compact detection system according to the invention. The detection threshold is indicated by the letter S. It is excellent as it is around 10 keV.

FIG. 3 shows the spectrum of an Am 241 source measured using the compact detection system according to the invention. It can be seen that the detection threshold is 10 keV, which is an extremely good performance. This is the value on the x-axis of the minimum on the left of the curve, between the noise to the left of this minimum and the source signal. The energy of the incident photons is 60 keV. The dimensions of the crystal are 9×9×20 mm.

Figure 4:
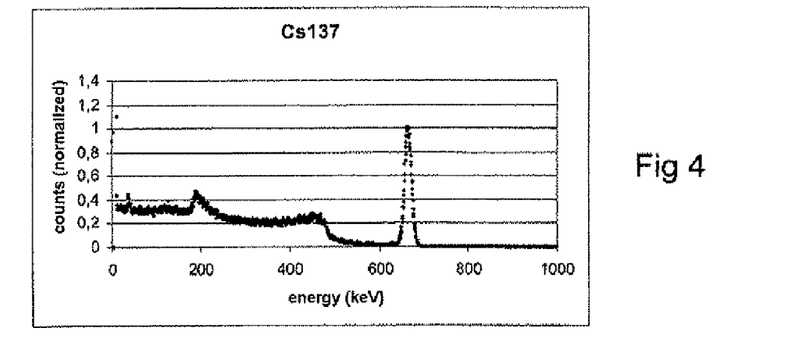
FIG. 4 shows the spectrum of a Cs 137 source (energy of incident photons of 662 keV) measured by a compact system according to the invention.

FIG. 4 shows the spectrum of a Cs 137 source (incident photon energy of 662 keV). The resolution (half-peak width divided by the energy) is 2.8%.

The invention claimed is:

1. An ionizing radiation detector comprising a housing containing:
   a scintillator material;
   an avalanche photodiode in contact with the scintillator material via optical coupling; and
   a preamplifier,
   wherein the two closest points, one of the preamplifier and the other of the scintillator material, are less than 2 cm apart, the scintillator material has a volume ranging from 1000 to 10000 mm³, and the volume of the housing is less than 300 cm³.

2. The detector as claimed in claim 1, which does not include a cooling system.

3. The detector as claimed in claim 1, wherein it detects X-rays or gamma rays and wherein the scintillator material is a rare-earth halide single-crystal.

4. The detector as claimed in claim 1, wherein it detects X-rays or gamma rays and wherein the scintillator material is a single crystal of cerium doped lanthanum bromide.

5. The detector as claimed in claim 1, wherein the housing comprises a metal.

6. The detector as claimed in claim 1, wherein the volume of the housing is less than 60 cm³.

7. The detector as claimed in claim 1, wherein the volume of the housing is less than 100 cm³.

8. An ionizing radiation detector comprising a housing containing:
   a scintillator material;
   an avalanche photodiode in contact with the scintillator material via optical coupling; and
   a preamplifier,
   wherein the thermal expansion coefficient of the optical coupling is between that of the scintillator material and that of the avalanche photodiode.

9. The detector as claimed in claim 8, wherein the optical coupling is an epoxy adhesive.

10. The detector as claimed in claim 8, wherein the refractive index of the optical coupling is between that of the scintillator material and that of the avalanche photodiode.

11. The detector as claimed in claim 8, wherein the contact face area of the scintillator material is less than 1.2 times the contact face area of the avalanche photodiode.

12. An ionizing radiation detector comprising a housing containing:
   a scintillator material consisting of a single crystal;
   an avalanche photodiode in contact with the scintillator material via optical coupling; and
   a preamplifier,
   wherein the contact face of the scintillator material is circumscribed in the contact face of the avalanche photodiode.

13. The detector as claimed in claim 12, wherein the contact face area of the scintillator material is less than 1 times the contact face area of the avalanche photodiode.

14. The detector as claimed in claim 12, wherein the contact face area of the scintillator material is from 0.8 to 1 times the contact face area of the avalanche photodiode.

15. The detector as claimed in claim 12, wherein every point of the edge of the contact face of the scintillator material is inside the contact face of the photodiode and at a distance of between 0.1 and 3 mm from the edge of the photodiode.

16. The detector as claimed in claim 12, wherein every point of the edge of the contact face of the scintillator material is inside the contact face of the photodiode and at a distance of between 0.2 and 0.7 mm from the edge of the photodiode.

17. The detector as claimed in claim 12, wherein the two closest points, one of the preamplifier and the other of the scintillator material, are less than 2 cm apart.

18. An ionizing radiation detector comprising a housing containing:

a scintillator material;
an avalanche photodiode in contact with the scintillator material via optical coupling; and
a preamplifier,
wherein the two closest points, one of the preamplifier and the other of the scintillator material, are less than 2 cm apart.

19. The ionizing radiation detector as claimed in claim 18, wherein the avalanche photodiode works at a voltage of less than 450 volts.

20. The detector as claimed in claim 18, wherein the avalanche photodiode is an array of avalanche photodiodes.

21. The detector as claimed in claim 18, wherein there is an electromagnetic shielding element between the avalanche photodiode and the preamplifier.

22. The detector as claimed in claim 18,
wherein the detector has a resolution at 662 keV of less than 3.5%.

23. The detector as claimed in claim 22, which has a resolution at 662 keV of less than 3%.

24. The detector as claimed in claim 22, which has a resolution at 662 keV of less than 2.9%.

25. The ionizing radiation detector as claimed in claim 18, wherein the preamplifier gain is between 0.1 V/pC and 10 V/pC.

26. An ionizing radiation detector comprising a housing containing:
a scintillator material,
an avalanche photodiode in contact with the scintillator material via optical coupling, and
a preamplifier,
wherein the detector has a detection threshold measured with an americium 241 source of less than 15 keV.

27. The detector as claimed in claim 26, wherein the detection threshold measured with an americium 241 source is less than 12 keV.

28. The detector as claimed in claim 26, wherein the detection threshold measured with an americium 241 source is less than 11 keV.

29. An ionizing radiation detector comprising a housing containing:
a scintillator material;
an avalanche photodiode in contact with the scintillator material via optical coupling; and
a preamplifier,
wherein the thickness of the optical coupling is less than 1 mm.

30. An X-ray or gamma ray detector comprising a housing with a volume of less than 100 $cm^3$ containing:
a rare-earth halide single-crystal scintillator material,
an avalanche photodiode in contact with the scintillator material via optical coupling,
a preamplifier,
the contact face area of the scintillator material being less than 1.2 times the contact face area of the avalanche photodiode, the resolution of said detector at 662 keV being less than 3.5%, and the detection threshold of said detector measured with an americium 241 source being less than 15 keV.

31. An X-ray or gamma ray detector comprising a housing with a volume of less than 60 $cm^3$ containing:
a rare-earth halide single-crystal scintillator material with a volume ranging from 1000 to 10000 $mm^3$; and
an avalanche photodiode in contact with the scintillator material via optical coupling, the thickness of the optical coupling is less than 1 mm,
the contact face area of the scintillator material being less than 1.2 times the contact face area of the avalanche photodiode, the resolution of said detector at 662 keV being less than 3.5%, and the detection threshold of said detector measured with an americium 241 source being less than 15 keV.

32. An ionizing radiation detector comprising a housing containing:
a scintillator material;
an avalanche photodiode in contact with the scintillator material via optical coupling; and
a preamplifier,
wherein there is an electromagnetic shielding element between the avalanche photodiode and the preamplifier.

* * * * *

UNITED STATES PATENT AND TRADEMARK OFFICE
CERTIFICATE OF CORRECTION

PATENT NO. : 7,767,975 B2
APPLICATION NO. : 12/037695
DATED : August 3, 2010
INVENTOR(S) : Jeremy Flamanc et al.

Page 1 of 1

It is certified that error appears in the above-identified patent and that said Letters Patent is hereby corrected as shown below:

Title page, item (75), delete "Fontainbleau" and insert therefor --Fontanebleau--.

Title page, item (74), delete "Christian Colombier".

Column 1, line 21, delete "US20071241284" and insert therefor --US2007/241284--.

Signed and Sealed this
Twenty-sixth Day of February, 2013

Teresa Stanek Rea
*Acting Director of the United States Patent and Trademark Office*